United States Patent
Nakamichi et al.

(10) Patent No.: US 12,010,980 B2
(45) Date of Patent: Jun. 18, 2024

(54) LURE

(71) Applicant: Shimano Inc., Sakai (JP)

(72) Inventors: Tadasuke Nakamichi, Sakai (JP); Tatsurou Kawasaki, Sakai (JP)

(73) Assignee: Shimano Inc., Sakai (JP)

(*) Notice: Subject to any disclaimer, the term of this patent is extended or adjusted under 35 U.S.C. 154(b) by 0 days.

(21) Appl. No.: 17/837,207

(22) Filed: Jun. 10, 2022

(65) Prior Publication Data

US 2023/0021516 A1 Jan. 26, 2023

(30) Foreign Application Priority Data

Jul. 21, 2021 (JP) ................................. 2021-120940

(51) Int. Cl.
  *A01K 85/01* (2006.01)

(52) U.S. Cl.
  CPC .................................. *A01K 85/015* (2022.02)

(58) Field of Classification Search
  CPC ...... A01K 85/015; A01K 85/00; A01K 85/01; A01K 85/011; A01K 85/012; A01K 85/013; A01K 85/017; A01K 85/16; A01K 85/18; A01K 85/1837; A01K 85/1873; A01K 85/01516
  USPC ............. 43/17.6, 42.12, 42.13, 42.31, 42.32, 43/42.33, 42.34, 42.39, 42.48
  See application file for complete search history.

(56) References Cited

U.S. PATENT DOCUMENTS

| | | | | |
|---|---|---|---|---|
| 990,984 | A | * | 5/1911 | Name not available ................... A01K 85/16 43/42.12 |
| 1,852,620 | A | * | 4/1932 | Martin .................... A01K 85/14 43/42.5 |
| D153,128 | S | * | 3/1949 | Ferris .......................... 43/42.12 |
| 2,629,960 | A | * | 2/1953 | Baxter .................... A01K 85/16 43/42.12 |
| 2,884,732 | A | * | 5/1959 | Bailer .................... A01K 85/16 43/42.33 |
| 2,909,863 | A | * | 10/1959 | Rector ................... A01K 85/01 43/42.49 |
| 3,260,011 | A | * | 7/1966 | Reamy ................... A01K 85/16 D22/129 |
| 3,540,144 | A | * | 11/1970 | Gurka .................... A01K 85/16 43/42.34 |
| 4,380,132 | A | * | 4/1983 | Atkinson ............... A01K 85/01 43/42.31 |

(Continued)

FOREIGN PATENT DOCUMENTS

| | | | | |
|---|---|---|---|---|
| JP | 2001299150 | A | * | 10/2001 |
| JP | 2002330668 | A | * | 11/2002 |

(Continued)

*Primary Examiner* — Timothy D Collins
*Assistant Examiner* — Maria E Graber
(74) *Attorney, Agent, or Firm* — United IP Counselors, LLC

(57) ABSTRACT

A lure includes a body provided with a cavity inside, an oscillating portion disposed in the cavity which is visible from outside and configured to emit light, and a connecting member made of a polymer elastomer and configured to attach the oscillating portion to the body oscillatably. The polymer elastomer is rubber or thermoplastic elastomer. The connecting member is rod-shaped and the cross-sectional shape of the connecting member is circular, oval or polygonal.

17 Claims, 5 Drawing Sheets

(56) References Cited

U.S. PATENT DOCUMENTS

| | | | | |
|---|---|---|---|---|
| 6,029,388 A * | 2/2000 | Yokogawa | A01K 85/01 | 43/17.5 |
| 6,108,960 A * | 8/2000 | Sylla | A01K 85/01 | 43/17.6 |
| 6,671,996 B1 * | 1/2004 | Ito | A01K 85/16 | 43/42.31 |
| 8,402,688 B2 * | 3/2013 | Choi | A01K 85/01 | 43/42.34 |
| 9,661,832 B2 * | 5/2017 | Scharlé | A01K 85/16 | |
| 11,439,133 B2 * | 9/2022 | Nakamichi | A01K 85/16 | |
| 11,716,979 B2 * | 8/2023 | Yagi | A01K 85/01 | 43/42 |
| 2005/0034349 A1 * | 2/2005 | Dugger | A01K 85/01 | 43/17.1 |
| 2008/0000140 A1 * | 1/2008 | Mitchell | A01K 85/01 | 43/42.06 |
| 2015/0264902 A1 * | 9/2015 | Scharle | A01K 85/01 | 43/42.31 |
| 2016/0309687 A1 * | 10/2016 | Ito | A01K 85/00 | |
| 2019/0320634 A1 * | 10/2019 | Kawasaki | A01K 85/16 | |
| 2021/0274762 A1 * | 9/2021 | Yagi | A01K 85/12 | |

FOREIGN PATENT DOCUMENTS

| | | | |
|---|---|---|---|
| JP | 2003219765 A * | 8/2003 | |
| JP | 2003289759 A * | 10/2003 | |
| JP | 2019-187246 A | 10/2019 | |

\* cited by examiner

LURE

CROSS-REFERENCE TO RELATED APPLICATIONS

This application claims priority to Japanese Patent Application No. 2021-120940, filed Jul. 21, 2021. The contents of that application are incorporated by reference herein in their entirety.

TECHNICAL FIELD

The present invention relates to lures used for fishing.

BACKGROUND ART

Larger fish such as large-mouth bass, yellowtail and its juveniles, and sea bass prey on smaller fish. These large fish are called fish eaters. Lure fishing has become a popular means of catching fish-eaters. In lure fishing, a lure that simulates a bait such as small fish is used. The lure is cast, flies in the air, and eventually lands on the water. When the line is reeled in, the lure swims in the water. Fish eaters, mistaking the lure for a bait, bite the lure. The hook attached to the lure pierces the fish eater, and the fish eater is caught. The frequency with which fish-eaters bite the lure is called the hit rate.

In order to increase hit rates, various innovations are made to lures. For example, the lure is coated with glossy coating. In this lure, when the lure moves, the state of light reflection changes to appeal to fish eaters. Another lure has a rattle ball in the space inside the body. When the lure moves, this ball rolls and makes a sound, appealing to fish eaters. A lure that has a transparent body with a built-in oscillating portion that emits light and can appeal to fish eaters even after the lure comes to a standstill is disclosed in Japanese Patent Application Publication No. 2019-187246.

To appeal to fish eaters, lure structure can easily become complicated. The complicated lure structure can deteriorate the easiness of assembling the lure. The complicated lure structure can also affect the durability of the lure. There is a need for lures that are easy to assemble and durable, and appeal to fish eaters.

BRIEF SUMMARY

The object of the present invention is to provide a lure that can appeal to fish eaters with excellent assembly and durability.

A lure according to an aspect of the present invention includes a body having a cavity inside, an oscillating portion, disposed in the cavity, that is visible from outside and configured to emit light, and a connecting member that attaches the oscillating portion to the body oscillatably and is made of a polymer elastomer.

In this lure, the oscillating portion, which is visible from outside and emits light, effectively appeals to fish eaters. The oscillating portion is attached to the body by the connecting member made of a polymer elastomer. The connecting member made of a polymer elastomer contributes to excellent easiness of assembly and durability. In this lure, excellent easiness of assembly and durability are realized.

DETAILED DESCRIPTION

The preferred embodiment will be described in detail below, with reference to the drawings as appropriate.

Figure 1:
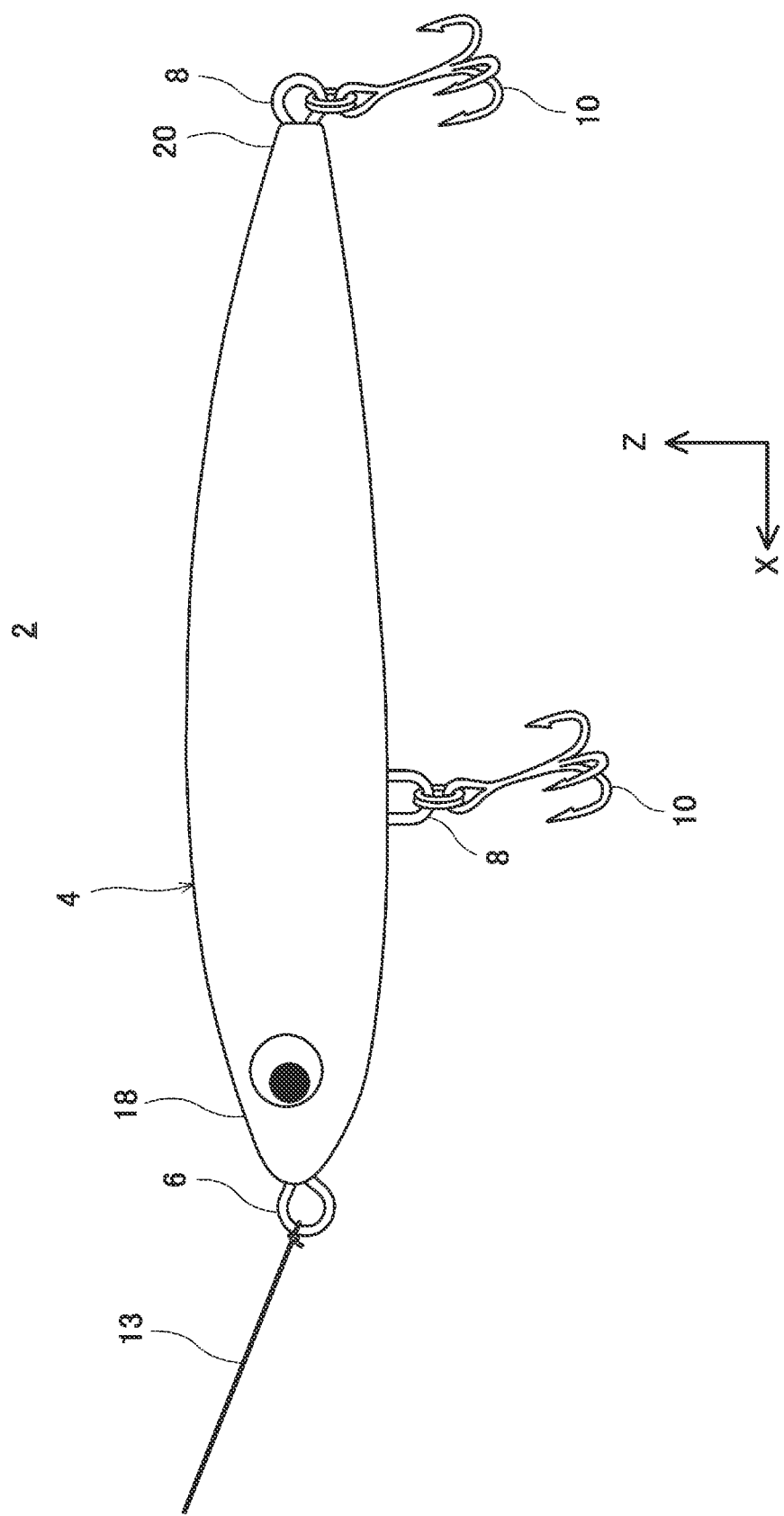
FIG. 1 is a side view of a lure according to an embodiment.

FIG. 1 is a side view showing a lure 2 according to an embodiment. In FIG. 1, the direction indicated by arrow X is forward of the lure 2 and the opposite direction is backward of the lure 2. The direction indicated by arrow Z is upward of the lure 2, and the opposite direction is downward of the lure 2. The direction perpendicular to the surface of the paper sheet is the left and right direction of the lure 2. Arrows X and Z represent the same meaning in FIG. 2. As shown in FIG. 1, the lure 2 is equipped with a body 4, a line eye 6, a hook eye 8, and a hook 10.

Figure 2:
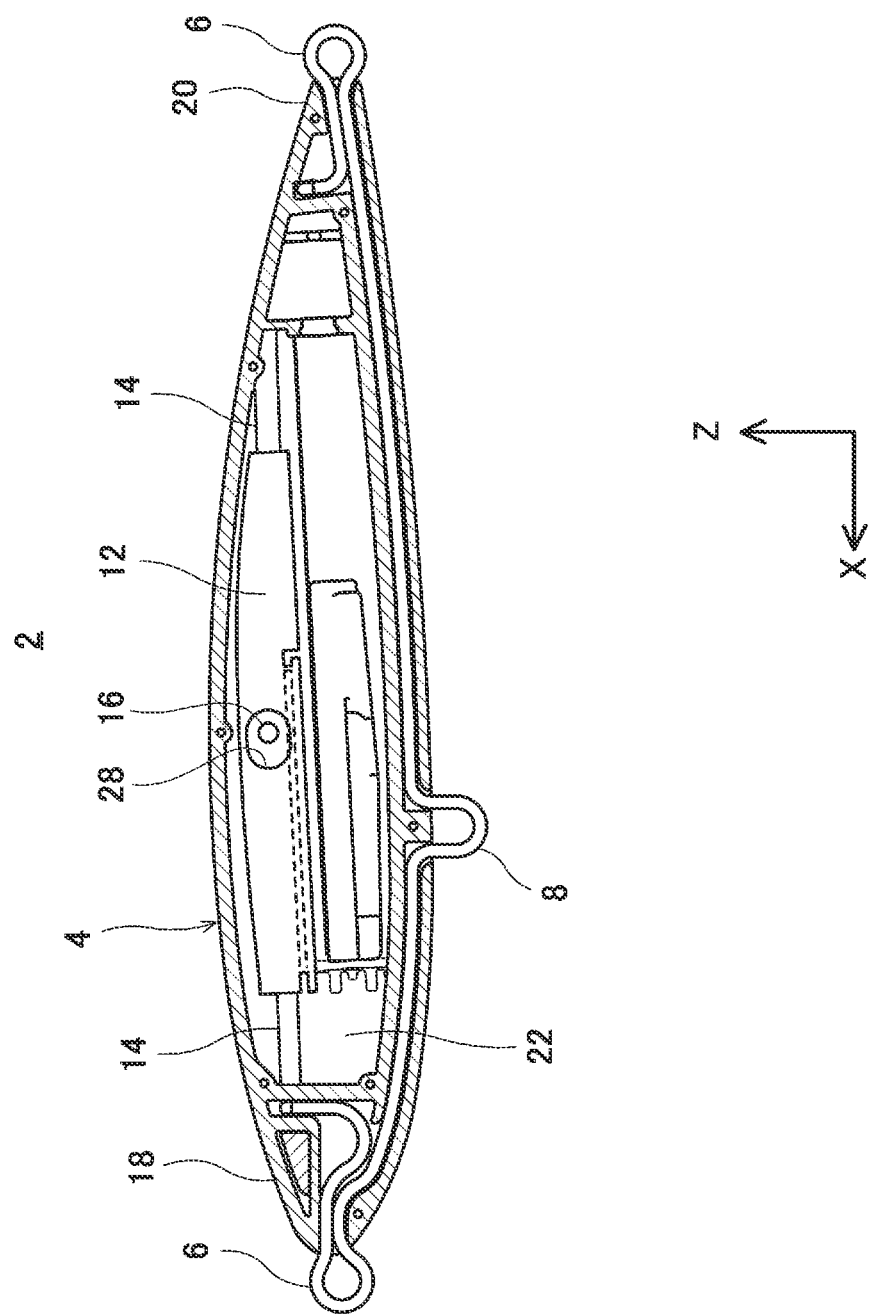
FIG. 2 is a cross-sectional view showing the right side of the lure shown in FIG. 1 when the lure is divided into left and right parts.

FIG. 2 is a cross-sectional view showing the right side of the lure 2 of FIG. 1 when it is divided into left and right parts. This figure shows the left half of the lure 2 removed. In this figure, the internal structure of the lure 2 can be seen. In FIG. 2, the lure 2 is hatched at the parts that come in contact with the left half when the left half of the lure 2 is attached. The lure 2 is further provided with an oscillating portion 12, a connecting member 14, and a bar 16.

The body 4 has an external shape similar to that of a small fish that is a bait. The body 4 is made of a hard material. Typically, the body 4 is made of a synthetic resin composition. The body 4 may be made of a soft material such as a thermoplastic elastomer. The body 4 has a head 18 and a tail 20. As shown in FIG. 2, the body 4 has a cavity 22 inside. The body 4 is transparent to the extent that light passes through this cavity 22. Although not shown in FIG. 1, the oscillating portion 12 within the cavity 22 is visible from outside. In this body 4, light from the oscillating portion 12 is visible from outside.

The line eye 6 is attached to the front end of the head 18. The hook eye 8 is attached to the body 4 near the center and the tail 20. The line eye 6 and the hook eye 8 are formed by bending metal wire. Both ends of the metal wire are embedded in the body 4. The line eye 6 and the hook eye 8 are firmly fixed to the body 4. A line is attached to the line eye 6. The hook 10 is attached to each hook eye 8. In this embodiment, the number of hooks 10 is two.

The oscillating portion 12 is located inside the cavity 22. The oscillating portion 12 extends in the front-back direction. The oscillating portion 12 is plate-shaped. The oscillating portion 12 has a hole 28 that penetrates in the thickness direction. The oscillating portion 12 receives light from outside and emits light. In this embodiment, the oscillating portion 12 is a reflective member. That is, the surface of the oscillating portion 12 reflects light. The surface of the oscillating portion 12 has glossiness. The surface of the oscillating portion 12 may be colored or patterned. The oscillating portion 12 is typically made of a synthetic resin composition. The oscillating portion 12 may be made of metal. Hologram plates and metal deposition plates are typical examples of the oscillating portion 12.

The connecting member 14 is located inside the cavity 22. As shown in FIG. 2, there are two connecting members 14 in this embodiment. One connecting member 14 is located in front of the oscillating portion 12. The other connecting member 14 is located behind the oscillating portion 12. Each of the connecting members 14 extends in the front-back direction. The oscillating portion 12 is mounted between these two connecting members 14.

Figure 3:
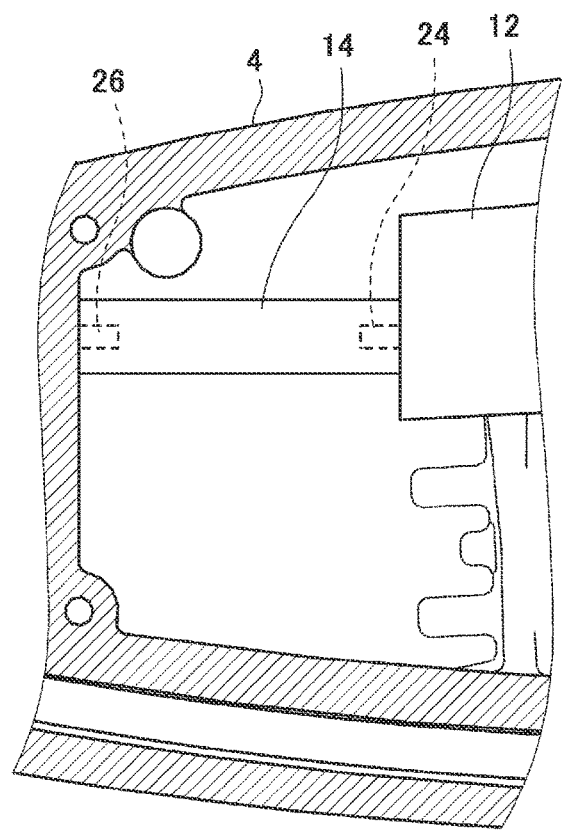
FIG. 3 is an enlarged cross-sectional view of a portion of FIG. 2.
Figure 4:
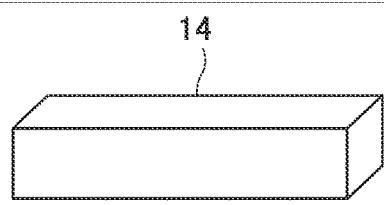
FIG. 4 is a perspective view of a connecting member shown in FIG. 2.

FIG. 3 shows an enlarged view of the proximity of the connecting member 14 located at the front. FIG. 4 is a perspective view showing the connecting member 14 located at the front. In this embodiment, the connecting member 14 has a rod shape with a rectangular cross section. As shown in FIG. 3, the oscillating portion 12 has a protrusion 24 at the front end. This protrusion 24 is inserted into the connecting member 14. This protrusion 24 is bonded to the connecting member 14. The connecting member 14 and the protrusion 24 of the oscillating portion 12 may be welded together. The oscillating portion 12 and the connecting member 14 are connected in this manner.

As shown in FIG. 3, the inner surface of the body 4 (the surface surrounding the cavity 22) has a protrusion 26 in an area where the body 4 is in contact with the connecting member 14 located at the front. The protrusion 26 is inserted into the connecting member 14. The protrusion 26 is bonded to the connecting member 14. Furthermore, the entire end face of the connecting member 14 on the body 4 side is bonded to the inner surface of the body 4. As a result, the oscillating portion 12 and the body 4 are connected. The connecting member 14 and the body 4 may be welded together.

The connecting member 14 located at the rear has the same shape as the connecting member 14 located at the front. FIG. 4 is also a perspective view of the connecting member 14 located at the rear. The connecting member 14 has a rod shape with a rectangular cross section. Although not shown in the figure, the oscillating portion 12 has a protrusion at the rear end. This protrusion is inserted into the connecting member 14. This protrusion is bonded to the connecting member 14. The connecting member 14 and the protrusion of the oscillating portion 12 may be welded together. The oscillating portion 12 and the connecting member 14 are connected in this manner.

Although not shown, the inner surface of the body 4 is provided with a protrusion in an area where the body 4 is in contact with the connecting member 14 located at the rear. This protrusion is inserted into the connecting member 14. This protrusion is bonded to the connecting member 14. Furthermore, the entire end face of the connecting member 14 on the body 4 side is bonded to the inner surface of the body 4. As a result, the oscillating portion 12 and the body 4 are connected. The connecting member 14 and the body 4 may be welded together.

The method of connecting the connecting member 14 and the oscillating portion 12 is not limited to the above methods. For example, a groove may be provided to extend vertically at the end face of the connecting member 14 on the oscillating portion 12 side, and a part of the oscillating portion 12 on the connecting member 14 side may be interposed in this groove. In this case, the part interposed in the groove of the oscillating portion 12 is bonded to the connecting member 14. The connecting member 14 and the oscillating portion 12 may be welded together. The method of connecting the connecting member 14 to the body 4 is not limited to the above methods. It is sufficient if the connecting member 14 and the body 4 are firmly connected.

The connecting member 14 is made of a polymer elastomer. That is, the connecting member 14 is an elastic body whose material is a polymeric composition. A typical polymer elastomer is rubber. In this embodiment, the material of the polymer elastomer is silicone rubber. In addition to silicone rubber, other examples of the rubber for the connecting member 14 include natural rubber, isoprene rubber, butadiene rubber, styrene butadiene rubber, chloroprene rubber, nitrile rubber, polyisobutylene, ethylene-propylene rubber, chlorosulfone polyethylene rubber, acrylic rubber, fluoro rubber, epichlorohydrin rubber, and urethane rubber.

The polymer elastomer may be a thermoplastic elastomer. Examples of the thermoplastic elastomer for the connecting member 14 include polystyrene thermoplastic elastomers, olefin/alkene thermoplastic elastomers, polyvinyl chloride thermoplastic elastomers, polyurethane thermoplastic elastomers, and polyester thermoplastic elastomers and polyamide thermoplastic elastomers.

The material of the polymer elastomer may be synthetic resin. Examples of the synthetic resin for the connecting member 14 include phenol resin, epoxy resin, melamine resin, urea resin, unsaturated polyester resin, alkyd resin, polyurethane, thermosetting polyimide, polyethylene, polypropylene, polystyrene, poly vinyl acetate, polyurethane, polylactic acid, polytetrafluoroethylene, ABS resin, AS resin, acrylic resin, polyvinyl chloride, polyvinylidene chloride, polyamide, polyacetal, polycarbonate, and polyester.

Since the connecting member 14 is made of a polymer elastomer, the connecting member 14 is elastic. Because the connecting member 14 is elastic, the oscillating portion 12 can oscillate with respect to the body 4. The oscillating portion 12 is attached to the body 4 oscillatably by the connecting member 14. The oscillating portion 12 can oscillate back and forth, up and down, or left and right. Even when the lure 2 is shifted from an operated state to a stopped state with respect to the outside world such as when a user stops pulling the lure 2 or when the water or tide stops flowing, the oscillating portion 12 in the lure 2 oscillates for a while. In other words, the connecting member 14 is elastic enough to allow the oscillating portion 12 to move even after the lure 2 has been brought to a stopped state from the operated state with respect to the outside world.

In this specification, elasticity of the connecting member 14 means that the Young's modulus of the polymer elastomer constituting the connecting member 14 is 3 GPa or less. When the material of the thermosetting polyimide is rubber or thermoplastic elastomer, the Young's modulus is measured in accordance with "JIS-K6251." The conditions are as follows:
  Specimen shape=No. 3 dumbbell
  Ambient temperature=23° C.
  Testing machine=Product name "Strograf" manufactured by Toyo Seiki Mfg.
  Tension rate=500 mm/min When the material of the polymer elastomer is synthetic resin, the Young's modulus is measured in accordance with "JIS K7161." The conditions are as follows:
Specimen shape=Type 2 shape specified in "JIS K7127"
Ambient temperature=23° C.
Testing machine=Precision universal testing machine (product name "Autograph" by Shimadzu Corporation)
Distance between chucks=100 mm
Tension rate=50 mm/min In the above embodiment, there were two connecting members 14 to attach the oscillating portion 12 to the body 4. The number of the connecting members 14 may be one. Instead of one of the two connecting members 14, another elastic body, such as a spring, may be used. For example, the body 4 and the front end of the oscillating portion 12 are connected by the connecting member 14, and the body 4 and to the rear end of the oscillating portion 12 may be connected by a spring. Alternatively, the body 4 and the front end of the oscillating portion 12 may be connected by a spring, and the body 4 and the rear end of the oscillating portion 12 may be connected by the connecting member 14.

The bar 16 is fixed to the body 4. The bar 16 extends inside the cavity 22 in the left-to-right direction. As shown in FIG. 2, the bar 16 is placed in the hole 28 of the oscillating portion 12. The outer diameter of the bar 16 is smaller than the inner diameter of the hole 28 of the oscillating portion 12. When the oscillating portion 12 is stationary in the normal position in which the lure 2 swims, the bar 16 is not in contact with the inner surface of the hole 28 of the oscillating portion 12. When the oscillating portion 12 moves, the oscillating portion 12 can come into contact with the bar 16. The bar 16 limits the range of motion of the oscillating portion 12 in the front-back direction and the vertical direction. The bar 16 is transparent to the extent that the oscillating portion 12 is visible from outside of the body 4.

The effects of the lure 2 are described below.

The lure 2 is equipped with the oscillating portion 12 that emits light within the cavity 22 of the body 4. The oscillating portion 12 is a reflective member. The surface of the oscillating portion 12 reflects light. The body 4 is transparent enough to allow light to pass into the cavity 22. The light reflected by the oscillating portion 12 can be visible from outside. The light reflected by the oscillating portion 12 appeals to fish eaters. A high hit rate can be expected with the lure 2.

The oscillating portion 12 of the lure 2 is attached to the body 4 by the connecting member 14 which is elastic. The connecting member 14 allows the oscillating portion 12 to oscillate back and forth, up and down, or left and right in accordance with the operation state of the lure 2 when the user pulls the lure 2 or when the water or tide flows fast. This movement of the oscillating portion 12 changes the state of light reflection. The appearance of the light emitted by the oscillating portion 12 changes. The oscillating portion 12 appears to twinkle. This effectively appeals to fish eaters. With this configuration of the lure 2, a high hit rate can be expected.

The connecting member 14 allows the oscillating portion 12 to move for a while even after the lure 2 is shifted from an operated state to a stopped state with respect to the outside world. The oscillating portion 12 will still move back and forth, up and down, or left and right for a while after the lure 2 has come to a stopped state when the user stops pulling the lure 2, or when the water or tide stops, etc. At this time, the oscillating portion 12 still appears to twinkle. The oscillating portion 12 effectively appeals to fish eaters for a while even after the lure 2 comes to a stop. A high hit rate can be expected with the lure 2.

In the lure 2, the connecting member 14 is made of a polymer elastomer. In this embodiment, the material of the connecting member 14 is rubber. The oscillating portion 12 is attached to the body 4 by the connecting member 14 which is made of rubber. The structure of the lure 2 is simple. In the lure 2, excellent easiness of assembly is achieved. Furthermore, the connecting member 14, which is made of rubber, does not easily come off from the oscillating portion 12 and the body 4 even when the lure 2 is subjected to external shocks. The lure 2 has excellent durability. In the lure 2, excellent durability is achieved.

In the lure 2, the connecting member 14 is rod-shaped. The oscillating portion 12 that connects to the rod-shaped connecting member 14 easily oscillates. This oscillating portion 12 effectively appeals to fish eaters. Furthermore, the rod-shaped connecting member 14 has suitable rigidity. Even if no tension is applied to the connecting member 14, the rigidity of the connecting member 14 can support the oscillating portion 12. Assembly of the lure 2 is easy.

In the lure 2, the cross-sectional shape of the connecting member 14 is rectangular. The oscillating portion 12 is more likely to oscillate in the direction in which the sides of this cross section extend (up and down or left and right in the embodiment of FIG. 2) than in the diagonal direction of this cross section. The connecting member 14 can make the oscillating portion 12 easier to oscillate in a certain direction.

As described above, due to the elastic connecting member 14, the oscillating portion 12 is able to sway back and forth, up and down, or left and right for a while even after the lure 2 is brought from the operated state to the stopped state. The time for the lure 2 to move is preferably more than 3 seconds, more preferably more than 5 seconds, and even more preferably more than 10 seconds.

From the viewpoint that the oscillating portion 12 moves longer even after it has moved from the operated state to the stopped state, the Young's modulus of the polymer elastomer constituting the connecting member 14 should be 1 GPa or less, more preferably 500 MPa or less, even more preferably 100 MPa or less, and most preferably 50 MPa or less.

From the viewpoint of effectively appealing to fish eaters, the reflectance of the oscillating portion 12 should be 0.3 or higher, more preferably 0.5 or higher, and even more preferably 0.7 or higher.

The lure 2 is preferably equipped with the bar 16. The bar 16 allows the oscillating portion 12 to move significantly, thereby preventing the oscillating portion 12 from getting between the structures inside the cavity 22 or being caught by such structure. Namely, the oscillating portion 12 is prevented from being fixed in an unusual position. Furthermore, the bar 16 prevents the oscillating motion of the oscillating portion 12 from becoming too large. The oscillating portion 12 can oscillate at a high frequency. The oscillating portion 12 appears to twinkle. This appeals more effectively to fish eaters. With this configuration of the lure 2, a high hit rate can be expected.

As mentioned above, the oscillating portion 12 is plate-shaped, and it is preferable that the oscillating portion 12 is attached so as to extend in the front-back direction. In this way, the oscillating portion 12 is easily visible from the side of the lure 2. The light reflected by the oscillating portion 12 effectively appeals to fish eaters. A high hit rate can be expected with the lure 2.

Figure 5A:
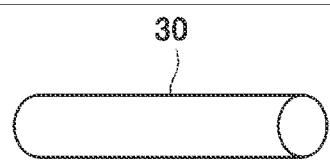
FIGS. 5A and 5B show the connecting member of the lure in other embodiments.

FIG. 5A is a perspective view showing a connecting member 30 of the lure according to another embodiment. The connecting member 30 has a rod-like shape with a circular cross section. In this lure, the oscillating portion tends to oscillate in all directions perpendicular to the direction in which the connecting member 30 extends (not only in the vertical or horizontal direction, but also in the direction between these directions).

In yet another embodiment of the lure, which is not shown in the figure, the connecting member has a rod shape with an oval cross section. The oscillating portion is more likely to oscillate in the direction in which the minor diameter of this cross section extends than in the direction in which the major diameter of this cross section extends. This connecting member can make the oscillating portion easier to oscillate in a certain direction.

Figure 5B:
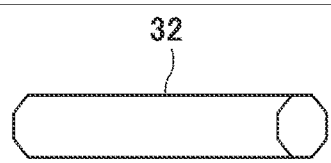

FIG. 5B is a perspective view showing a connecting member 32 of the lure according to yet another embodiment. The connecting member 32 has a rod shape with a hexagonal cross section. The oscillating portion is more likely to oscillate in the direction in which the sides of this cross section extend than in the direction in which the diagonal line of this cross section extends. The connecting member 32 can make the oscillating portion easier to oscillate in a certain direction.

The cross-sectional shape of the connecting member is not limited to the above embodiments. The cross-sectional shape may be triangular or pentagonal. The cross-sectional shape may be a polygon with seven or more vertices.

Figure 6A:
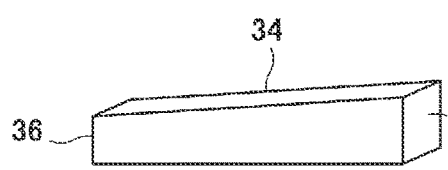
FIGS. 6A, 6B, 6C, and 6D show the connecting member of the lure according to yet another embodiment.

FIG. 6A is a perspective view showing a connecting member 34 of the lure according to yet another embodiment. In the connecting member 34, the front end (the end on the left side of the paper sheet) is the end on the body side, and the rear end (the end on the right side of the paper sheet) is the end on the oscillating portion side. The connecting member 34 is rod-shaped with a rectangular cross section. The area of an end face 36 on the body side and the area of an end face 38 on the oscillating portion side are different in the connecting member 34. In this embodiment, the area of the end face 36 on the body side is smaller than the area of the end face 38 on the oscillating portion side. The thickness of the connecting member 34 is gradually thicker from the body side to the oscillating portion side. In the connecting member 34, the body side is more easily deformed than the oscillating portion side. The oscillating portion oscillates mainly at the end of the connecting member 34 on the body side as a base point. This oscillating portion oscillates widely and slowly.

Figure 6B:
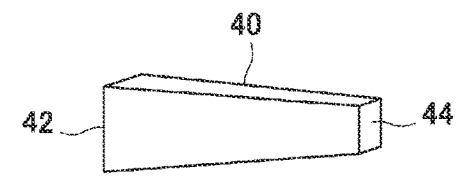

FIG. 6B is a perspective view showing a connecting member 40 of the lure according to yet another embodiment. In the connecting member 40, the front end is the end on the body side and the rear end is the end on the oscillating portion side. The connecting member 40 has a rod shape with a rectangular cross section. In the connecting member 40, the area of an end face 42 on the body side is larger than the area of an end face 44 on the oscillating portion side. The thickness of the connecting member 40 gradually decreases from the body side to the oscillating portion side. In the connecting member 40, the oscillating portion side is more easily deformed than the body side. The oscillating portion oscillates mainly at the end of the connecting member 40 on the oscillating portion side as a base point. The oscillation of this oscillating portion is small and fast.

Figure 6C:
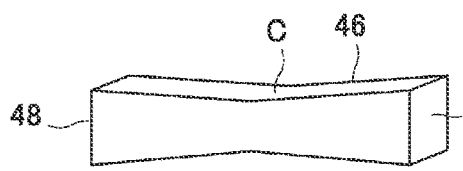

FIG. 6C is a perspective view showing a connecting member 46 of the lure according to yet another embodiment. In the connecting member 46, the front end is the end on the body side and the rear end is the end on the oscillating portion side. The connecting member 46 has a rod shape with a rectangular cross section. In the connecting member 46, the cross-sectional area at a predetermined position between the two end faces of the connecting member 46 (position C in FIG. 6C) is different from either one of the area of an end face 48 on the body side and the area of an end face 50 on the oscillating portion side. The cross-sectional area at position C is smaller than the area of the end face 48 on the body side and the area of the end face 50 on the oscillating portion side. The thickness of the connecting member 46 becomes gradually thinner from the body side to position C and gradually thicker from position C to the oscillating portion side. In the connecting member 46, the part at position C is easily deformed, so the oscillating portion tends to oscillate mainly at position C as a base point. Because of the small deformation at the body end of the connecting member 46, the connecting member 46 is difficult to be displaced from the body. Because of the small deformation at the oscillating end of the connecting member 46, the connecting member 46 is difficult to be displaced from the oscillating portion. This lure achieves excellent durability.

Figure 6D:
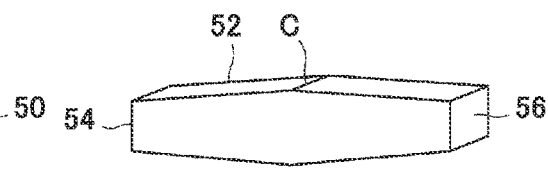

FIG. 6D is a perspective view showing a connecting member 52 of the lure according to yet another embodiment. In the connecting member 52, the front end is the end on the body side and the rear end is the end on the oscillating portion side. The connecting member 52 has a rod shape with a rectangular cross section. In the connecting member 52, the cross-sectional area at a predetermined position between the two end faces of the connecting member 52 (position C in FIG. 6C) is larger than the area of an end face 54 on the body side and the area of an end face 56 on the oscillating portion side. The thickness of the connecting member 52 becomes gradually thicker from the body side to position C and gradually thinner from position C to the oscillating portion side. In the connecting member 52, both ends are more easily deformed than position C. The oscillating portion oscillates mainly at the ends of the connecting member 52 on the oscillating portion side and on the body side as a base point. The movement of this oscillating portion can be a mixture of small, fast oscillations and large, slow oscillations.

Figure 7A:
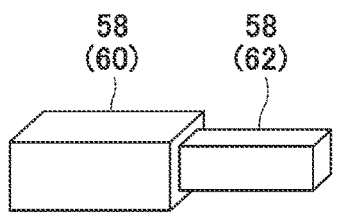
FIGS. 7A and 7B are perspective views of the connecting member of the lure according to yet another embodiment.

FIG. 7A is a perspective view of connecting members 58 of the lure according to yet another embodiment. This lure has two connecting members 58 between one end of the oscillating portion and the body. The lure has a first connecting member 60 and a second connecting member 62 between the oscillating portion and the body. The second connecting member 62 is located on the side of the oscillating portion relative to the first connecting member 60. Each of the first connecting member 60 and the second connecting member 62 is rod-shaped with a rectangular cross section.

The first connecting member 60 and the second connecting member 62 have different characteristics. Here, characteristics refer to physical properties, such as shape, size, elastic modulus, etc. In this embodiment, the cross-sectional areas of the first connecting member 60 and the second connecting member 62 are different. The cross-sectional area of the first connecting member 60 is larger than the cross-sectional area of the second connecting member 62. The first connecting member 60 is thicker than the second connecting member 62. The second connecting member 62 is more easily deformed than the first connecting member 60. The oscillating portion oscillates mainly at the second connecting member 62 as a base point. The oscillation of this oscillating portion is small and fast.

Figure 7B:
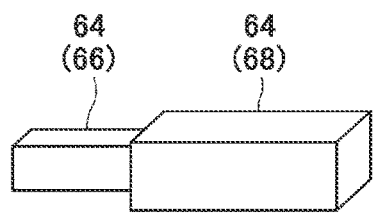

FIG. 7B is a perspective view of connecting members 64 of the lure according to yet another embodiment. This lure has two connecting members 64 between one end of the oscillating portion and the body. The lure has a first connecting member 66 and a second connecting member 68 between the front end of the oscillating portion and the body. The second connecting member 68 is located on the side of the oscillating portion relative to the first connecting member 66. Each of the first connecting member 66 and the second connecting member 68 is rod-shaped with a rectangular cross section.

In this embodiment, the cross-sectional area of the first connecting member 66 is smaller than that of the second connecting member 68. The first connecting member 66 is thinner than the second connecting member 68. The first connecting member 66 is more easily deformed than the second connecting member 68. The oscillating portion oscillates mainly at the first connecting member 66 as a base point. This oscillating portion oscillates widely and slowly.

Figure 8:
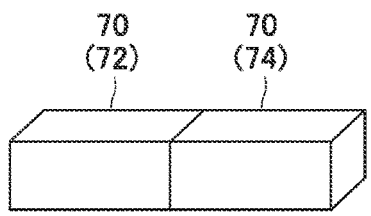
FIG. 8 is a perspective view showing the connecting member of the lure according to yet another embodiment.

FIG. 8 is a perspective view of connecting members 70 of the lure according to yet another embodiment. This lure has two connecting members 70 between one end of the oscillating portion and the body. The lure has a first connecting member 72 and a second connecting member 74 between the oscillating portion and the body. The second connecting member 74 is located on the side of the oscillating portion relative to the first connecting member 72. Each of the first connecting member 72 and the second connecting member 74 is rod-shaped with a rectangular cross section.

The first connecting member 72 and the second connecting member 74 have different characteristics. In this embodiment, the first connecting member 72 is made of a first polymer elastomer and the second connecting member 74 is made of a second polymer elastomer. The Young's modulus of the first polymer elastomer is greater than that of the second polymer elastomer. The second connecting member 74 is more easily deformed than the first connecting member 72. The oscillating portion oscillates mainly at the second connecting member 74 as a base point. The oscillation of this oscillating portion is small and fast.

In yet another embodiment, the lure has a connecting member of the same shape as the connecting member 70 shown in FIG. 8. This lure has a first connecting member and a second connecting member between the front end of the oscillating portion and the body. The second connecting member is located on the side of the oscillating portion relative to the first connecting member. Each of the first and second connecting members is rod-shaped with a rectangular cross section.

In this embodiment, the first connecting member is made of a first polymer elastomer and the second connecting member is made of a second polymer elastomer. The Young's modulus of the first polymer elastomer is smaller than that of the second polymer elastomer. The first connecting member is more easily deformed than the second connecting member. The oscillating portion oscillates mainly at the first connecting member as a base point. This oscillating portion oscillates greatly and slowly.

Figure 9A:
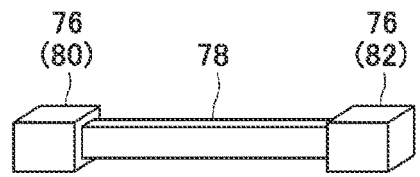
FIGS. 9A and 9B show a perspective view of the connecting member of the lure according to yet another embodiment.

FIG. 9A is a perspective view of connecting members 76 of the lure according to yet another embodiment. The lure has two connecting members 76 and an intermediate portion 78 between one end of the oscillating portion and the body. In detail, the lure has a first connecting member 80, a second connecting member 82 located on the side of the oscillating portion relative to the first connecting member 80, and the intermediate portion 78 located between the first connecting member 80 and the second connecting member 82. Each of the first connecting member 80, the second connecting member 82, and the intermediate portion 78 has a rod shape with a rectangular cross section. In this embodiment, the intermediate portion 78 is made of a polymer elastomer. In other words, the intermediate portion 78 is a third connecting member.

The intermediate portion 78 is different in characteristics from the first connecting member 80 and the second connecting member 82. In this embodiment, the cross-sectional area of the intermediate portion 78 is different from both the cross-sectional area of the first connecting member 80 and the cross-sectional area of the second connecting member 82. The cross-sectional area of the intermediate portion 78 is smaller than the cross-sectional area of the first connecting member 80 and the second connecting member 82. The intermediate portion 78 is thinner than the first connecting member 80 and the second connecting member 82. The intermediate portion 78 is more deformable than the first connecting member 80 and the second connecting member 82. In this lure, the oscillating portion tends to oscillate starting from the intermediate portion 78. The deformation of the first connecting member 80 is small because the cross-sectional area of the first connecting member 80 is large. The first connecting member 80 is difficult to detach from the body. Because the cross-sectional area of the second connecting member 82 is large, the deformation of the second connecting member 82 is small. The second connecting member 82 is difficult to detach from the oscillating portion. Excellent durability is achieved in this lure.

Although not shown in the figure, the lure in yet other embodiments has a first connecting member, a second connecting member located on the oscillating portion side relative to the first connecting member, and an intermediate portion located between the first and second connecting members. Each of the first connecting member, the second connecting member, and the intermediate portion has a rod shape with a rectangular cross section. In this embodiment, the intermediate portion is made of a polymer elastomer. In other words, the intermediate portion is the third connecting member.

In this embodiment, the cross-sectional area of the intermediate portion is larger than the cross-sectional area of the first and second connecting members. The intermediate portion is thicker than the first and second connecting members. The first and second connecting members are more easily deformed than the intermediate portion. The oscillating portion oscillates mainly at the first and second connecting members as a base point. In this oscillating portion movement, there is a mixture of small and fast oscillations and large and slow oscillations.

Figure 9B:
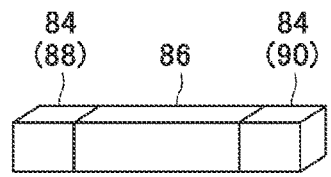

FIG. 9B is a perspective view of connecting members 84 of the lure according to yet another embodiment. The lure has two connecting members 84 and an intermediate portion 86 between one end of the oscillating portion and the body. In detail, the lure has a first connecting member 88, a second connecting member 90 located on the side of the oscillating portion relative to the first connecting member 88, and the intermediate portion 86 located between the first connecting member 88 and the second connecting member 90. Each of the first connecting member 88, the second connecting member 90, and the intermediate portion 86 has a rod shape with a rectangular cross section. In this embodiment, the intermediate portion 86 is made of a polymer elastomer. In other words, the intermediate portion 86 is a third connecting member.

In this embodiment, the first connecting member 88 is made of a first polymer elastomer, the second connecting member 90 is made of a second polymer elastomer, and the intermediate portion 86 is made of a third polymer elastomer. The Young's modulus of the third polymer elastomer is smaller than the Young's modulus of the first polymer elastomer and the second polymer elastomer. The intermediate portion 86 is more easily deformed than the first connecting member 88 and the second connecting member 90. In this lure, the oscillating portion tends to oscillate starting from the intermediate portion 86. Since the deformation of the first connecting member 88 is small, the first connecting member 88 is difficult to detach from the body. Because the deformation of the second connecting member 90 is small, the second connecting member 90 is difficult to detach from the oscillating portion. Excellent durability is achieved in this lure.

In yet another embodiment, the lure has a first connecting member, a second connecting member on the side of the oscillating portion, and an intermediate portion similarly to the lure shown in FIG. 9B. In this lure, the Young's modulus of the third polymer elastomer is greater than the Young's modulus of the first and second polymer elastomers. The first connecting member and the second connecting member are more easily deformed than the intermediate portion. The oscillating portion oscillates mainly at the first connecting member and the second connecting member as a base point. In this oscillating portion movement, there is a mixture of small and fast oscillations and large and slow oscillations.

Although not shown in the figure, the lure of yet another embodiment has a first connecting member, a second connecting member located on the oscillating portion side relative to the first connecting member, and an intermediate portion located between the first and second connecting members. In this lure, the intermediate portion is not made of a polymer elastomer. In this lure, the intermediate portion is a spring. In this lure, the oscillating motion of the oscillating portion is irregular and complex.

Figure 10A:
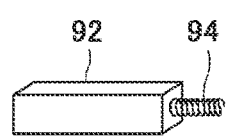
FIGS. 10A and 10B show a perspective view of the connecting member of the lure according to yet another embodiment.
Figure 10B:
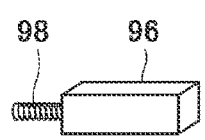

FIG. 10A is a perspective view of a connecting member 92 of the lure according to yet another embodiment. In this lure, a spring 94 is provided between the oscillating portion and the connecting member 92 made of a polymer elastomer. FIG. 10B is a perspective view of a connecting member 96 of the lure according to yet another embodiment. In this lure, a spring 98 is provided between the body and the connecting member 96 made of a polymer elastomer. In these lures, the oscillating motion of the oscillating portion is irregular and complex.

Figure 11:
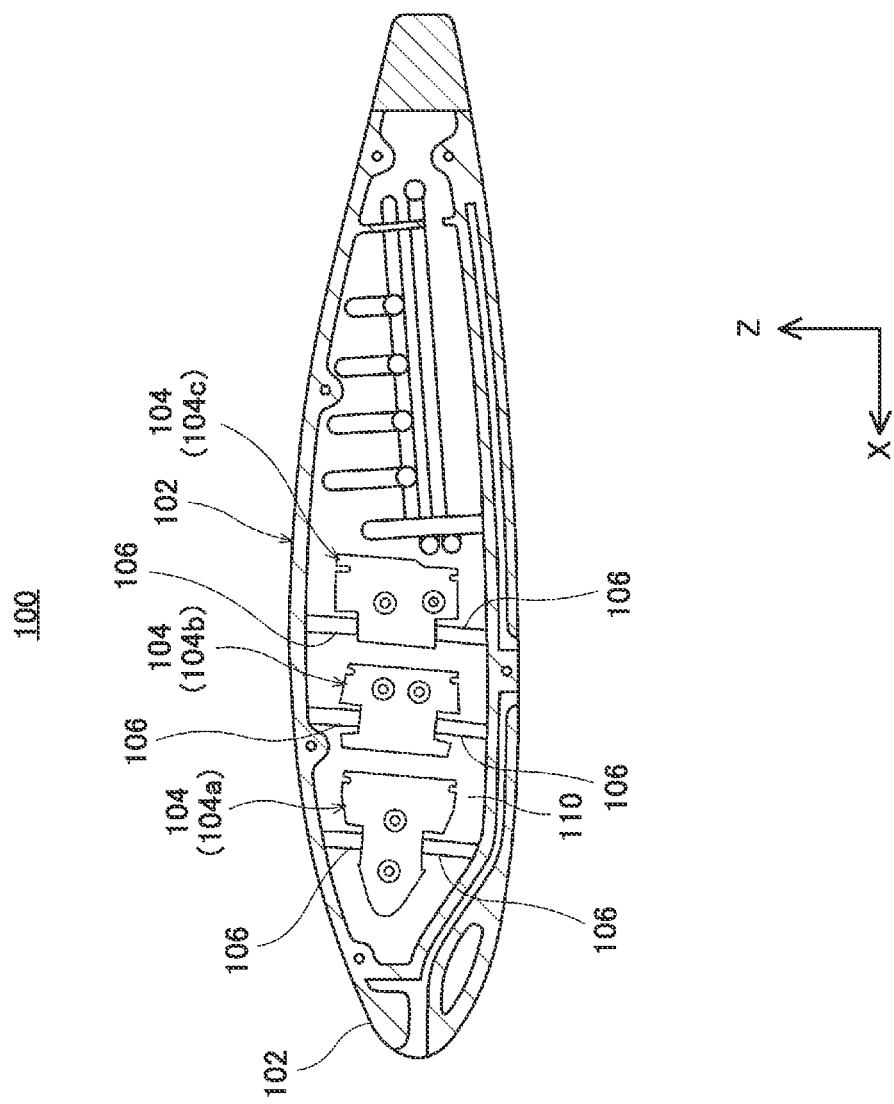
FIG. 11 is a cross-sectional view showing the right side of the lure when it is divided into left and right parts according to yet another embodiment.

FIG. 11 shows yet another embodiment of a lure 100. This figure is a cross-sectional view showing the right side of the lure 100 when the lure 100 is divided into left and right parts. In this figure, the internal structure of the lure 100 is visible. In FIG. 11, the direction indicated by arrow X shows the front of the lure 100 is the front of the lure 100, and the opposite shows the back of the lure 100. The direction indicated by arrow Z is upward of lure 100, and the opposite is downward of the lure 100. The direction perpendicular to the surface of the paper sheet is the left and right direction of the lure 100. As shown in FIG. 11, the lure 100 has a body 102, an oscillating portion 104 and a connecting member 106.

As shown in FIG. 11, the oscillating portion 104 is disposed inside a cavity 110 of the body 102. A plurality of oscillating portions 104 are aligned in the front-back direction. In this embodiment, the three oscillating portions 104 including a first oscillating portion 104a, a second oscillating portion 104b, and a third oscillating portion 104c are located in the cavity 110. Each of the oscillating portions 104 is plate-shaped. Each of the oscillating portion 104 is provided with a hole penetrating in the thickness direction.

The oscillating portion 104 receives light from outside and emits light. In this embodiment, the oscillating portion 104 is a reflective member. That is, the surface of the oscillating portion 104 reflects light. The surface of the oscillating portion 104 has glossiness. The surface of the oscillating portion 104 may be colored or patterned. The oscillating portion 104 is typically made of a synthetic resin composition. The oscillating portion 104 may be made of metal. A holoplate is a typical example of the oscillating portion 104. The oscillating portion 104 may be a fluorescent member.

The connecting member 106 is located inside the cavity 110. The connecting member 106 is made of a polymer elastomer. As shown in FIG. 11, the connecting member 106 includes one located on the upper side of the oscillating portion 104 and another one located on the lower side of the oscillating portion 104. In this embodiment, the number of the connecting members 106 located on the upper side and the number of the connecting members 106 located on the lower side are 3, respectively. Each connecting member 106 is rod-shaped. The cross section of each connecting member 106 is rectangular. Each connecting member 106 extends in the vertical direction.

As shown in FIG. 11, the upper end of the connecting member 106, located on the upper side, connects to the inner surface of the body 102. The lower end of this connecting member 106 connects to the oscillating portion 104. The lower end of the connecting member 106, located on the lower side, connects to the inner surface of the body 102. The upper end of this connecting member 106 connects to the oscillating portion 104. The oscillating portion 104 is attached between the upper connecting member 106 and the lower connecting member 106. The oscillating portion 104 can oscillate with respect to the body 102 by these connecting members 106. The oscillating portion 104 can oscillate back and forth, up and down, or left and right by these connecting members 106. The oscillating portion 104 is movable with respect to the body 102 by the connecting members 106. The oscillating portion 104 is movably attached to the body 102 via the connecting members 106.

The oscillating portion 104 of the lure 100 is attached to the body 102 by the elastic connecting member 106. The connecting member 106 allows the oscillating portion 104 to oscillate back and forth, up and down, or left and right when the user pulls the lure 100 or when the water or tide is fast in the operation of the lure 100. This movement of the oscillating portion 104 changes the state of light reflection. The appearance of the light emitted by the oscillating portion 104 changes. The oscillating portion 104 appears to twinkle. This effectively appeals to fish eaters. With this configuration of the lure 100, a high hit rate can be expected.

In the lure 100, the connecting member 106 is made of a polymer elastomer. In this embodiment, the connecting member 106 is made of rubber. The oscillating portion 104 is attached to the body 102 by the connecting member 106 made of rubber. The structure of the lure 100 is simple. In the lure 100, excellent easiness of assembly is achieved. Furthermore, the connecting member 106, made of rubber, does not easily detach from the oscillating portion 104 and the body 102 even when the lure 100 is subjected to an external impact. In the lure 100, excellent durability is achieved.

In the embodiments described above, the oscillating portion is a reflective member. The oscillating portion may be a fluorescent member that emits light when receiving light from outside. The oscillating portion may be a phosphorescent material that emits light when receiving light from outside. In this oscillating portion, the surface of the body of the oscillating portion, made of elastic material, is painted with phosphorescent paint.

The oscillating portion may be a transmissive member that receives light from outside and focuses or diffuses the light. Lenses and prisms are examples of a typical transmissive member. In this oscillating portion, the lens or prism is formed of elastic material.

The oscillating portion may be a luminescent member that emits light by itself. A typical luminescent member is a chemiluminescent member that uses light emission from a chemical reaction. Another example of a luminescent member is a light emitting device. For example, an oscillating portion with a light emitting diode and a battery fixed to the body is used.

In the above, an embodiment with a lure for fish is described. Although not mentioned in detail here, this lure can also be applied to lures for marine products other than fish, such as squid jig.

As explained above, this lure has excellent assembly and durability and can appeal to fish eaters. The lure has clear advantages.

According to the present invention, the lure includes a body having a cavity inside, an oscillating portion provided in the cavity that is visible from outside and configured to emit light, and a connecting member that attaches the oscillating portion to the body oscillatably and is made of a polymer elastomer.

In the lure, the polymer elastomer is rubber or thermoplastic elastomer.

In the lure, the connecting member is rod-shaped and the cross-sectional shape of the connecting member is circular, oval or polygonal.

In the lure, the area of the end face of the connecting member on the body side is different from the area of the end face of the connecting member on the oscillating portion side.

In the lure, the cross-sectional area at a predetermined position between the two end faces of the connecting member is different from both the area of the end face on the body side and the end face on the oscillating portion side.

In the lure, the connecting member includes a first connecting member, and a second connecting member located on the oscillating portion side relative to the first connecting member and has different characteristics from the first connecting member.

In the lure, the cross-sectional area of the second connecting member is different from the cross-sectional area of the first connecting member.

In the lure, the first connecting member is made of a first polymer elastomer and the second connecting member is made of a second polymer elastomer with different properties from the first polymer elastomer.

In the lure, the connecting member includes a first connecting member, a second connecting member located on the oscillating portion side relative to the first connecting member, and an intermediate portion located between the first connecting member and the second connecting member and having different characteristics from both the first connecting member and the second connecting member.

In the lure, the intermediate portion is made of a polymer elastomer.

In the lure, the cross-sectional area of the intermediate portion is different from both the cross-sectional area of the first connecting member and the cross-sectional area of the second connecting member.

In the lure, the first connecting member is made of a first polymer elastomer, the second connecting member is made of a second polymer elastomer, and the intermediate portion is made of a third polymer elastomer whose properties differ from both the first and second polymer elastomers.

In the lure, the connecting member is bonded or welded to the oscillating portion.

In the lure, the oscillating portion is one of a reflective, fluorescent, phosphorescent, and transmissive member that emits light when receiving light from outside.

In the lure, the oscillating portion is a luminous member that emits light by itself.

This lure is suitable for fishing in various fields such as lakes, ponds, dams, rivers, and oceans.

REFERENCE SIGNS LIST 2, 100 . . . Lure
4, 102 . . . Body
6 . . . Line eye
8 . . . Hook eye
10 . . . Hook
12, 104 . . . Oscillating portion
14, 30, 32, 34, 40, 46, 52, 58, 64, 70, 76, 84, 92, 96, 106 . . . Connecting member
16 . . . Bar
18 . . . Head
20 . . . Tail
22, 110 . . . Cavity
24, 26 . . . Protrusion
28 . . . Hole
60, 66, 72, 80, 88 . . . First connecting member
62, 68, 74, 82, 90 . . . Second connecting member
78, 86 . . . Intermediate portion
94, 96 . . . Spring

The invention claimed is:

1. A lure comprising:
a body having a cavity inside;
a bar fixed to and extending from an interior wall of the cavity into the cavity;
an oscillating portion disposed in the cavity, the oscillating portion being visible from outside and configured to emit light and including a hole therein, larger than the bar, that receives the bar; and
a connecting member that attaches the oscillating portion to the body oscillatably and is made of a polymer elastomer, a first end of the connecting member on a body side being fixedly connected to the body, and a second end of the connecting member on an oscillating portion side being fixedly connected to the oscillating portion, such that resilient deformation of the connecting member allows movement of the oscillating portion relative to the body;
wherein contact between the bar and the hole limits motion of the oscillating portion in front-back and vertical directions.

2. The lure according to claim 1, wherein the polymer elastomer is rubber or thermoplastic elastomer.

3. The lure according to claim 1, wherein
the connecting member is rod-shaped and a cross-sectional shape of the connecting member is circular, oval, or polygonal.

4. The lure according to claim 1, wherein
an area of an end face of the connecting member at the first end on the body side is different from an area of an end face of the connecting member at the second end on the oscillating portion side.

5. The lure according to claim 1, wherein
a cross-sectional area of the connecting member at a predetermined position between two end faces of the connecting member is different from both an area of an end face of the connecting member at the first end on the body side and an end face of the connecting member at the second end on the oscillating portion side.

6. The lure according to claim 1, wherein
the connecting member includes a first connecting member and a second connecting member that is disposed on the oscillating portion side relative to the first connecting member and has different characteristics from the first connecting member.

7. The lure according to claim 6, wherein
a cross-sectional area of the second connecting member is different from that of the first connecting member.

8. The lure according to claim 6, wherein
the first connecting member is made of a first polymer elastomer, and
the second connecting member is made of a second polymer elastomer having different properties from the first polymer elastomer.

9. The lure according to claim 6, wherein
the first connecting member and the second connecting member extend in a front-back direction of the lure, and
the oscillating portion is disposed between the first connecting member and the second connecting member.

10. The lure according to claim 1, wherein
the connecting member includes a first connecting member, a second connecting member disposed on the oscillating portion side relative to the first connecting member, and an intermediate portion, the intermediate portion being disposed between the first connecting member and the second connecting member and having different characteristics from both the first connecting member and the second connecting member.

11. The lure according to claim 10, wherein
the intermediate portion is made of a polymer elastomer.

12. The lure according to claim 11, wherein
a cross-sectional area of the intermediate portion is different from both a cross-sectional area of the first connecting member and a cross-sectional area of the second connecting member.

13. The lure according to claim 11, wherein
the first connecting member is made of a first polymer elastomer,
the second connecting member is made of a second polymer elastomer, and
the intermediate portion is made of a third polymer elastomer whose properties differ from both the first and second polymer elastomers.

14. The lure according to claim 1, wherein
the connecting member is bonded or welded to the oscillating portion.

15. The lure according to claim 1, wherein
the oscillating portion includes a protrusion that is inserted into the connecting member.

16. The lure according to claim 1, wherein
the oscillating portion is one of a reflective, fluorescent, phosphorescent, or transmissive member that emits light from outside.

17. The lure according to claim 1, wherein
the oscillating portion is a luminous body that emits light by itself.

* * * * *